US012790271B2

(12) United States Patent
Schönlein et al.

(10) Patent No.: US 12,790,271 B2
(45) **Date of Patent: *Nov. 10, 2026**

(54) USE OF A CALCIUM CARBONATE OF HIGH PURITY AND HAVING A HIGH SPECIFIC SURFACE AREA IN AN INORGANIC MORTAR SYSTEM BASED ON ALUMINOUS CEMENT TO ACCELERATE CALCIUM ALUMINATE CEMENT HYDRATION

(71) Applicant: Hilti Aktiengesellschaft, Schaan (LI)

(72) Inventors: Markus Schönlein, Gilching (DE); Friedlinde Goetz-Neunhoeffer, Erlangen (DE); Julian Goergens, Erlangen (DE)

(73) Assignee: Hilti Aktiengesellschaft, Schaan (LI)

( * ) Notice: Subject to any disclaimer, the term of this patent is extended or adjusted under 35 U.S.C. 154(b) by 416 days.

This patent is subject to a terminal disclaimer.

(21) Appl. No.: 18/576,325

(22) PCT Filed: Jun. 22, 2022

(86) PCT No.: PCT/EP2022/067037

§ 371 (c)(1),
(2) Date: Jan. 3, 2024

(87) PCT Pub. No.: WO2023/280572

PCT Pub. Date: Jan. 12, 2023

(65) Prior Publication Data

US 2024/0294431 A1 Sep. 5, 2024

(30) Foreign Application Priority Data

Jul. 8, 2021 (EP) .................................... 21184417

(51) Int. Cl.

| | |
|---|---|
| ***C04B 28/06*** | (2006.01) |
| ***C04B 14/28*** | (2006.01) |
| ***C04B 14/48*** | (2006.01) |
| ***C04B 22/06*** | (2006.01) |
| ***C04B 22/14*** | (2006.01) |
| ***C04B 22/16*** | (2006.01) |
| ***C04B 24/06*** | (2006.01) |
| ***C04B 103/10*** | (2006.01) |
| ***C04B 103/20*** | (2006.01) |
| ***C04B 111/00*** | (2006.01) |
| ***C09K 8/467*** | (2006.01) |
| ***E04B 1/41*** | (2006.01) |

(52) U.S. Cl.

CPC .............. *C04B 28/06* (2013.01); *C04B 14/28* (2013.01); *C04B 14/48* (2013.01); *C04B 22/062* (2013.01); *C04B 22/147* (2013.01); *C04B 22/165* (2013.01); *C04B 24/06* (2013.01); *C09K 8/467* (2013.01); *E04B 1/4157* (2013.01); *C04B 2103/10* (2013.01); *C04B 2103/20* (2013.01); *C04B 2111/00715* (2013.01)

(58) Field of Classification Search

CPC ......... C09K 8/467; C04B 14/06; C04B 14/28; C04B 22/062; C04B 22/10; C04B 22/147; C04B 22/165; C04B 24/06; C04B 28/06; C04B 2103/10; C04B 2103/20; C04B 2111/00715; C04B 28/145; C04B 40/0658; E04B 1/4157; Y02W 30/91

See application file for complete search history.

(56) References Cited

U.S. PATENT DOCUMENTS

| | | | |
|---|---|---|---|
| 10,822,284 | B2 | 11/2020 | Pfeil et al. |
| 11,214,518 | B2 | 1/2022 | Pfeil et al. |
| 11,214,519 | B2 | 1/2022 | Falger et al. |
| 11,267,765 | B2 | 3/2022 | Sharmak et al. |
| 11,718,564 | B2 | 8/2023 | Pfeil et al. |
| 2015/0203407 | A1 | 7/2015 | Girot et al. |
| 2018/0282217 | A1 | 10/2018 | Falger et al. |
| 2018/0290935 | A1 | 10/2018 | Pfeil et al. |
| 2019/0071353 | A1 | 3/2019 | Pfeil et al. |

(Continued)

FOREIGN PATENT DOCUMENTS

| | | |
|---|---|---|
| EP | 3 636 616 | 4/2020 |
| JP | 2015-531737 A | 11/2015 |

(Continued)

OTHER PUBLICATIONS

International Search Report received for PCT Application No. PCT/EP2022/067037, mailed on Sep. 13, 2022, 3 pages.

(Continued)

*Primary Examiner* — Anthony J Green

(74) *Attorney, Agent, or Firm* — Grüneberg Global IP, PLLC

(57) ABSTRACT

An inorganic mortar system includes a curable aluminous cement component A and an initiator component B for initiating the curing process, as well as a calcium carbonate with a crystalline calcite content determined by XRD of greater than 80% and a specific surface area of greater than 15 $m^2/g$ in component A and/or component B. Component A further includes at least one blocking agent selected from the group consisting of boric acid, phosphoric acid, metaphosphoric acid, phosphorous acid and phosphonic acids, at least one accelerator, and water, and component B includes an activator, at least one retarder, at least one mineral filler, and water. Moreover, the calcium carbonate accelerates calcium aluminate cement hydration. A method for the chemical fastening of anchors and post-installed reinforcing bars in mineral substrates is developed.

14 Claims, 2 Drawing Sheets

(56) References Cited

U.S. PATENT DOCUMENTS

| | | | |
|---|---|---|---|
| 2020/0377424 A1 | 12/2020 | Sharmak et al. |
| 2021/0380481 A1 | 12/2021 | Pfeil et al. |
| 2021/0387913 A1 | 12/2021 | Pfeil et al. |
| 2022/0098107 A1 | 3/2022 | Falger et al. |
| 2024/0343968 A1 | 10/2024 | Schönlein |

FOREIGN PATENT DOCUMENTS

| | | |
|---|---|---|
| JP | 2018-534228 A | 11/2018 |
| JP | 2018-536609 A | 12/2018 |
| JP | 2019-500297 A | 1/2019 |
| JP | 2024-524128 A | 7/2024 |
| WO | 2017/067956 | 4/2017 |
| WO | 2018/184973 | 10/2018 |
| WO | 2020/074348 | 4/2020 |

OTHER PUBLICATIONS

Written Opinion received for PCT Application No. PCT/EP2022/067037, mailed on Sep. 13, 2022, 6 pages.

USE OF A CALCIUM CARBONATE OF HIGH PURITY AND HAVING A HIGH SPECIFIC SURFACE AREA IN AN INORGANIC MORTAR SYSTEM BASED ON ALUMINOUS CEMENT TO ACCELERATE CALCIUM ALUMINATE CEMENT HYDRATION

CROSS-REFERENCE TO RELATED APPLICATIONS

This application is a National Stage entry under § 371 of International Application No. PCT/EP2022/067037, filed on Jun. 22, 2022, and which claims the benefit of priority to European Patent Application No. 21184417.0, filed on Jul. 8, 2021. The content of each of these applications is hereby incorporated by reference in its entirety.

BACKGROUND OF THE INVENTION

Field of the Invention

The present invention pertains to a use of a calcium carbonate of high purity and having a high specific surface area (BET in $m^2/g$) in an inorganic mortar system for a chemical fastening of anchors and post-installed reinforcing bars in mineral substrates, comprising a curable aluminous cement component A and an initiator component B for initiating the curing process, component A further comprising at least one blocking agent selected from the group consisting of boric acid, phosphoric acid, metaphosphoric acid, phosphorous acid and phosphonic acids, at least one accelerator, at least one plasticizer and water, and component B comprising an activator, at least one retarder, at least one mineral filler and water. In particular, the present invention pertains to the use of a calcium carbonate having a crystalline calcite content determined by XRD of greater than 80% and having a specific surface area of greater than 15 $m^2/g$ in an inorganic mortar system for a chemical fastening of anchors and post-installed reinforcing bars in mineral substrates to accelerate calcium aluminate cement hydration. Moreover, the present invention pertains to a method for a chemical fastening of anchors and post-installed reinforcing bars, preferably of metal anchors and post-installed reinforcing bars, in mineral substrates, such as structures made of brickwork, concrete, pervious concrete or natural stone.

Description of Related Art

Many mortar systems exist which provide a good chemical fastening of anchors and post-installed reinforcing bars in mineral substrates or surfaces. For example, organic systems based on free-radically polymerizable resins are used when fast curing is desired. However, such systems are generally known to be polluting, expensive, potentially hazardous and/or toxic for the environment and for the person who handles them and they often need to be specifically labelled. Moreover, organic systems often show a much reduced stability when thermally exposed to strong sunlight or otherwise elevated temperatures, such as fire, thereby decreasing their mechanical performance when it comes to chemically fastening of anchors and post-installed reinforcing bars.

In order to overcome these drawbacks, predominantly mineral systems based on aluminous cement have been developed. Aluminous cement has as its major constituent monocalcium aluminate and is widely used in the building and construction industries as the final products evidence a high level of mechanical performance over extended periods of time. Also, aluminous cement is resistant to bases and attains its maximum strength more rapidly than Portland cement and is capable of withstanding solutions of sulfates. Hence, aluminous cement systems are preferably employed in the field of chemical anchoring.

When it comes to chemical fastening of anchors and post-installed reinforcing bars in mineral substrates, most of the known systems lack sufficient fluidity for most practical applications of the resultant compositions. Often such prior art compositions also evidence a tendency to crack in a relatively short time or do not exhibit the required mechanical performance, in particular under certain conditions such as under the influence of elevated temperatures, in different conditioned boreholes as well as over a long period of time. Moreover, known systems tend to exhibit a large extend of shrinkage when applied in a borehole which results in an insufficient anchoring of the anchors and post-installed reinforcing bars.

In particular, calcium aluminate slurries are known to give high fire resistance for fastening points. However, compared to resin-based fastening mortars the hardening of such systems is rather slow, which requires longer waiting times on job sites and often leads to interruptions in the workflow. This is especially critical for anchoring applications, where immediate loading is of high importance. Additionally, calcium aluminate-based mortar suffers from conversion, which leads to a decrease of performance over time due to transformation of metastable hydrate phases $CAH_{10}$ and $C_2AH_8$ to the stable hydrate $C_3AH_6$.

Therefore, there is a need for an inorganic mortar system, preferably a two-component inorganic mortar system, which is superior over the prior art systems. In particular, it is of interest to provide a system that can be used for a chemical fastening of anchors and post-installed reinforcing bars in mineral substrates without adversely affecting the handling, characteristics and the mechanical performance of the chemical anchoring system. Especially, there is a need for a system that provides for an accelerated calcium aluminate cement hydration when compared to the known systems. In addition, there is a need to improve the acceleration of calcium aluminate cement hydration by the addition of fillers or particles materials, such as an inorganic chemical anchor, to save expensive labor time, speed up construction work at a building site as well as to lower the consumption of more expensive binder material or to improve some properties of the mixed material. Most important, there is a need for an inorganic calcium aluminate cement-based system, wherein conversion, which leads to a decrease of performance over time due to transformation of metastable hydrate phases $CAH_{10}$ and $C_2AH_8$ to the stable hydrate $C_3AH_6$, is prevented and at the same time acceleration of the hydration is promoted.

In view of the above, it is an object of the present invention to provide an inorganic mortar system, preferably a multiple-component mortar system, in particular a two-component inorganic mortar system, which has an excellent mechanical performance, even at short curing times, and at the same time having increased load values when compared to the known systems. In particular, to provide an inorganic mortar system wherein conversion, which leads to a decrease of performance over time due to transformation of metastable hydrate phases $CAH_{10}$ and $C_2AH_8$ to the stable hydrate $C_3AH_6$, is prevented and at the same time acceleration of the hydration is promoted.

Moreover, it is an object of the present invention to provide a method for a chemical fastening of anchors and post-installed reinforcing bars, preferably of metal anchors and post-installed reinforcing bars, in mineral substrates, such as structures made of brickwork, concrete, pervious concrete or natural stone.

These and other objectives as they will become apparent from the ensuring description of the invention are solved by the present invention as described herein. The description pertains to preferred embodiments.

SUMMARY OF THE INVENTION

In one aspect, the present invention pertains to a use of calcium carbonate having a crystalline calcite content determined by XRD of greater than 80% and having a specific surface area of greater than 15 $m^2/g$ in an inorganic mortar system for a chemical fastening of anchors and post-installed reinforcing bars in mineral substrates, comprising a curable aluminous cement component A and an initiator component B for initiating the curing process. Component A further comprises at least one blocking agent selected from the group consisting of boric acid, phosphoric acid, metaphosphoric acid, phosphorous acid and phosphonic acids, at least one accelerator and water, and component B comprising an activator, at least one retarder, at least one mineral filler and water.

In another aspect, the present invention pertains to a use of calcium carbonate having a crystalline calcite content determined by XRD of greater than 80% and having a specific surface area of greater than 15 $m^2/g$ in an inorganic mortar system for a chemical fastening of anchors and post-installed reinforcing bars in mineral substrates to accelerate calcium aluminate cement hydration.

Finally, in another aspect, the present invention pertains to a method for a chemical fastening of anchors and post-installed reinforcing bars in mineral substrates, characterized in that an inorganic mortar system is used for fastening, which comprises a curable aluminous cement component A and an initiator component B for initiating the curing process, wherein component A further comprises at least one blocking agent, at least one accelerator and water, and component B comprising an activator, at least one retarder, at least one mineral filler and water, and which contains calcium carbonate having a crystalline calcite content determined by XRD of greater than 80% and having a specific surface area of greater than 15 $m^2/g$. The mineral substrates are substrates such as structures made of brickwork, concrete, pervious concrete or natural stone.

DETAILED DESCRIPTION OF THE INVENTION

Figure 1:
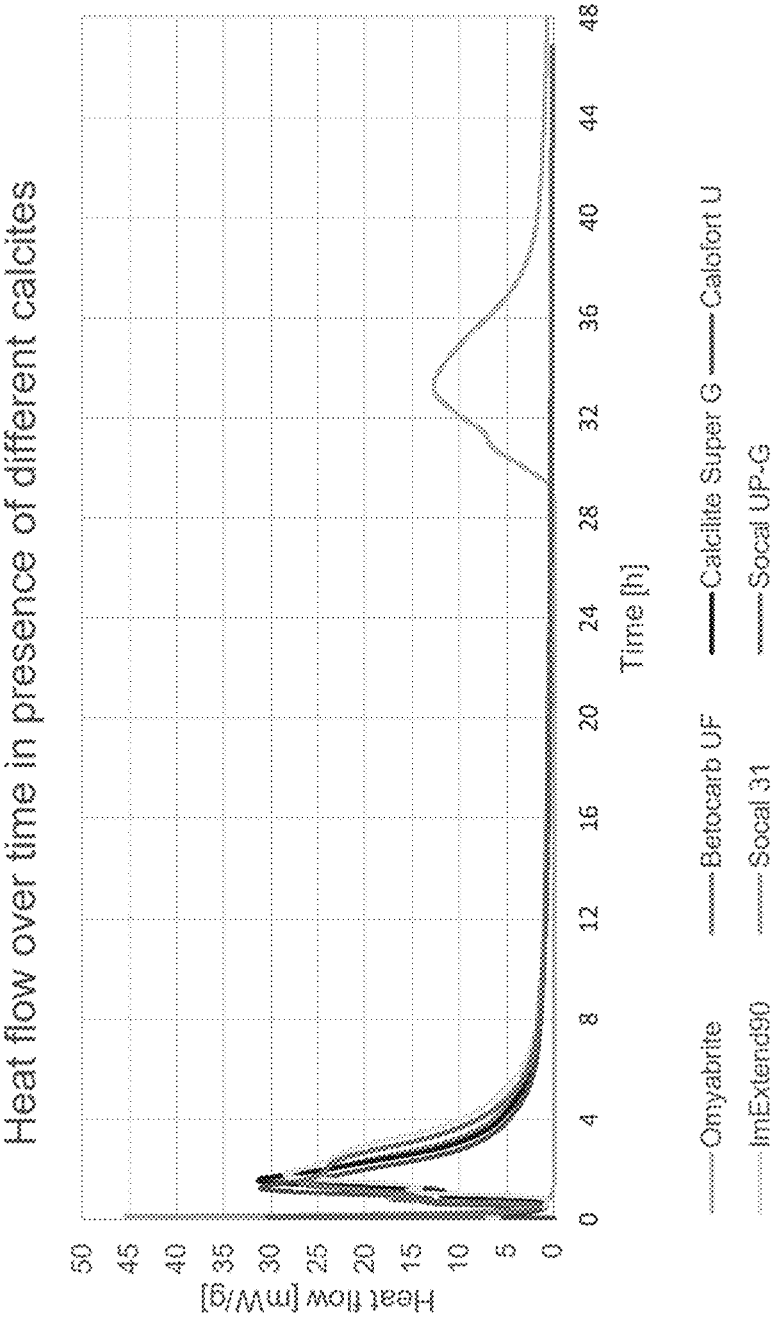
FIG. 1 shows a first graph of heat flow measurements of the hydration of calcium aluminate cement admixed with different types of calcites.

The following terms and definitions will be used in the context of the present invention:

As used in the context of present invention, the singular forms of "a" and "an" also include the respective plurals unless the context clearly dictates otherwise. Thus, the term "a" or "an" is intended to mean "one or more" or "at least one", unless indicated otherwise.

The term "aluminous cement" in the context of the present invention refers to a calcium aluminate cement that consists predominantly of hydraulic active calcium aluminates. Alternative names are "high-alumina cement" or "Ciment fondu" in French. The main active constituent of calcium aluminate cements is monocalcium aluminate ($CaAl_2O_4$, $CaO \cdot Al_2O_3$, or CA in the cement chemist notation).

The term "activator" in the context of the present invention refers to a compound or composition that modifies the chemical environment to start a particular chemical reaction. In the present invention the activator modifies the pH-value of the mortar suspension thereby de-blocking the hydraulic binder in the final mixture.

The term "retarder" in the context of the present invention refers to a compound or composition that modifies the chemical environment to delay a particular chemical reaction. In the present invention the retarder modifies the hydration ability of the calcium aluminate cement of the mortar suspension thereby delaying the hydraulic binder action in the final mixture.

The term "accelerator" in the context of the present invention refers to a compound or composition that modifies the chemical environment to promote a particular chemical reaction. In the present invention the accelerator modifies the hydration ability of the calcium aluminate cement of the mortar suspension thereby speeding up the hydraulic binder action in the final mixture.

The term "initial set-time" in the context of the present invention refers to the time at which the mixture of component A and component B starts to set after mixing. During the time period after mixing, the mixture stays in the form of a more or less fluid aqueous suspension or paste of solid products.

The term "XRD" refers to X-ray powder diffraction, a rapid analytical technique primarily used for phase identification of a crystalline material.

The term "crystalline calcite content determined by XRD" pertains to the relative amount of calcium carbonate exhibiting the ordered crystal structure/lattice of the calcite modification of the total amount of calcium carbonate as determined by XRD Rietveld analysis.

It has been surprisingly found out by the inventors, that the addition of a calcium carbonate having a crystalline calcite content determined by XRD of greater than 80% and having a specific surface area of greater than 15 $m^2/g$ to an inorganic mortar system for a chemical fastening of anchors and post-installed reinforcing bars in mineral substrates, comprising a curable aluminous cement component, preferably based on calcium aluminate cement, results in a significant acceleration of calcium aluminate cement hydration when compared to a system not comprising any calcium carbonate having a crystalline calcite content determined by XRD of greater than 80% and having a specific surface area of greater than 15 $m^2/g$ or only comprising calcium carbonate having a high specific surface area. It has also been found out that the addition of a calcium carbonate having a crystalline calcite content determined by XRD of greater than 80% and having a specific surface area of greater than 15 $m^2/g$ does not adversely affecting the handling, characteristics and the mechanical performance of the chemical anchoring system, especially when applied with short curing times.

In addition, it has been found that the use of a calcium carbonate having a crystalline calcite content determined by XRD of greater than 80% and having a specific surface area of greater than 15 $m^2/g$ can counteract conversion. It is known that this effect can be mitigated by the use of calcites to provoke formation of the stable monocarbonate instead of metastable phases. Furthermore, it is known that calcium carbonates may accelerate the hydration of calcium aluminate cement. However, the accelerating effect has previously been only attributed to the particle size of the calcium carbonates.

Hence, the inventors have surprisingly found that conversion of the inventive inorganic mortar system is prevented, which usually leads to a decrease of performance over time due to transformation of metastable hydrate phases $CAH_{10}$ and $C_2AH_8$ to the stable hydrate $C_3AH_6$, and at the same time acceleration of the hydration is promoted.

Therefore, the present invention pertains to a use of calcium carbonate having a crystalline calcite content determined by XRD of greater than 80% and having a specific surface area of greater than 15 $m^2/g$ in an inorganic mortar system for a chemical fastening of anchors and post-installed reinforcing bars in mineral substrates, comprising a curable aluminous cement component A and an initiator component B in for initiating the curing process. In particular, component A further comprises at least one blocking agent selected from the group consisting of boric acid, phosphoric acid, metaphosphoric acid, phosphorous acid and phosphonic acids, at least one accelerator and water, and component B comprises an activator, at least one retarder, at least one mineral filler and water.

Component A as used in the present invention is based on an aluminous cement (CAC) or a calcium sulfoaluminate cement (CSA). The aluminous cement component which can be used in the present invention is preferably an aluminous cement component based on an aqueous-phase calcium aluminate cement (CAC). The aluminous cement to be used in the present invention is characterized by rapid set and rapid hardening, rapid drying, excellent resistance to corrosion and shrinkage. Such a calcium aluminate cement suitable to be used in the present invention is for example Ternal® White (Kerneos, France).

If component A comprises a mixture of aluminous cement (CAC) and calcium sulfate ($CaSO_4$), rapid ettringite formation takes place during hydration. In concrete chemistry hexacalcium aluminate trisulfate hydrate, represented by the general formula $(CaO)_6(Al_2O_3)(SO_3)_3 \cdot 32\ H_2O$ or $(CaO)_3(Al_2O_3)(CaSO_4)_3 \cdot 32H_2O$, is formed by the reaction of calcium aluminate with calcium sulfate, resulting in quick setting and hardening as well as in shrinkage compensation or even expansion. With moderate increase of the sulfate content shrinkage compensation can be achieved.

Component A as used in the present invention comprises at least about 40 wt.-%, preferably at least about 50 wt.-%, more preferably at least about 60 wt.-%, most preferably at least about 70 wt.-%, from about 40 wt.-% to about 95 wt.-%, preferably from about 50 wt.-% to about 85 wt.-%, more preferably from about 60 wt.-% to about 80 wt.-%, most preferably from about 70 wt.-% to about 75 wt.-% of aluminous cement, based on the total weight of component A.

According to an alternative embodiment of the invention, component A as used comprises at least about 20 wt.-%, preferably at least about 30 wt.-%, more preferably at least about 40 wt.-%, most preferably at least about 50 wt.-%, from about 20 wt.-% to about 80 wt.-%, preferably from about 30 wt.-% to about 70 wt.-%, more preferably from about 35 wt.-% to about 60 wt.-%, most preferably from about 40 wt.-% to about 55 wt.-% of aluminous cement, based on the total weight of component A and at least about 5 wt.-%, preferably at least about 10 wt.-%, more preferably at least about 15 wt.-%, most preferably at least about 20 wt.-%, from about 1 wt.-% to about 50 wt.-%, preferably from about 5 wt.-% to about 40 wt.-%, more preferably from about 10 wt.-% to about 30 wt.-%, most preferably from about 15 wt.-% to about 25 wt.-% of calcium sulfate, preferably calcium sulfate hemihydrate, based on the total weight of component A. In a preferred alternative embodiment of the two-component mortar system of the present invention, the ratio of $CaSO_4$/CAC of component A should be less or equal to 35:65.

The blocking agent comprised in component A as used in the present invention is selected from the group consisting of boric acid, phosphoric acid, metaphosphoric acid, phosphorous acid and phosphonic acids, preferably is phosphoric acid or metaphosphoric acid, most preferably is phosphoric acid, in particular an 85% aqueous solution of phosphoric acid. Component A comprises at least about 0.1 wt.-%, preferably at least about 0.3 wt.-%, more preferably at least about 0.4 wt.-%, most preferably at least about 0.5 wt.-%, from about 0.1 wt.-% to about 20 wt.-%, preferably from about 0.1 wt.-% to about 15 wt.-%, more preferably from about 0.1 wt.-% to about 10 wt.-%, most preferably from about 0.3 wt.-% to about 10 wt.-% of said blocking agent, based on the total weight of component A. In a preferred embodiment, component A comprises from about 0.3 wt.-% to about 10 wt.-% of 85% aqueous solution of phosphoric acid, based on the total weight of component A. Preferably, the amounts of aluminous cement and/or calcium sulfoaluminate cement by weight relative to the hydraulic binder total weight are higher than any of the following values: 50%, 60%, 70%, 80%, 90%, 95%, 99% or are 100%.

The accelerator, or accelerator component, is constituted of at least one alkali and/or earth alkaline metal salt selected from the group consisting of hydroxides, chlorides, sulfates, phosphates, monohydrogen phosphates, dihydrogen phosphates, nitrates, carbonates and mixtures thereof, preferably the accelerator component is an alkali or earth alkaline metal salt, still preferably is a water-soluble alkali or earth alkaline metal salt, more preferably is a calcium metal salt, such as calcium hydroxide, calcium sulfate, calcium carbonate, calcium nitrate, calcium nitrite, calcium chloride, calcium formate or calcium phosphate, a sodium metal salt, such as sodium hydroxide, sodium sulfate, sodium carbonate, sodium nitrate, sodium nitrite, sodium chloride, sodium formate or sodium phosphate, or a lithium metal salt, such as lithium hydroxide, lithium sulfate, lithium sulfate monohydrate, lithium carbonate, lithium nitrate, lithium chloride, lithium formate or lithium phosphate, most preferably is lithium sulfate or lithium sulfate monohydrate. Component A comprises at least about 0.01 wt.-%, preferably at least about 0.05 wt.-%, more preferably at least about 0.1 wt.-%, most preferably at least about 1.0 wt.-%, from about 0.01 wt.-% to about 25 wt.-%, preferably from about 0.05 wt.-% to about 20 wt.-%, more preferably from about 0.1 wt.-% to about 15 wt.-%, most preferably from about 1.0 wt.-% to about 10 wt.-% of said accelerator, based on the total weight of component A.

Component A may additionally comprise a plasticizer. The plasticizer comprised in component A may be selected from the group consisting of low molecular weight (LMW) polyacrylic acid polymers, superplasticizers from the family of polyphosphonate polyox and polycarbonate polyox, and ethacryl superplasticizers from the polycarboxylate ether group, and mixtures thereof, for example Ethacryl™ G (Coatex, Arkema Group, France), Acumer™ 1051 (Rohm and Haas, U.K.), or Sika® ViscoCrete®-20 HE (Sika, Germany). Suitable plasticizers are commercially available products. Component A may comprise at least about 0.2 wt.-%, preferably at least about 0.3 wt.-%, more preferably at least about 0.4 wt.-%, most preferably at least about 0.5 wt.-%, from about 0.2 wt.-% to about 20 wt.-%, preferably from about 0.3 wt.-% to about 15 wt.-%, more preferably from about 0.4 wt.-% to about 10 wt.-%, most preferably from about 0.5 wt.-% to about 5 wt.-% of said plasticizer, based on the total weight of component A.

In an advantageous embodiment, component A as used in the present invention further comprises the following characteristics, taken alone or in combination.

Component A may additionally comprise a thickening agent. The thickening agents which can be used in the present invention may be selected from the group consisting of organic products, such as xanthan gum, welan gum or DIUTAN® gum (CPKelko, USA), starched-derived ethers, guar-derived ethers, polyacrylamide, carrageenan, agar, and mineral products, such as clay, and their mixtures. Suitable thickening agents are commercially available products. Component A comprises at least about 0.01 wt.-%, preferably at least about 0.1 wt.-%, more preferably at least about 0.2 wt.-%, most preferably at least about 0.3 wt.-%, from about 0.01 wt.-% to about 10 wt.-%, preferably from about 0.1 wt.-% to about 5 wt.-%, more preferably from about 0.2 wt.-% to about 1 wt.-%, most preferably from about 0.3 wt.-% to about 0.7 wt.-% of said thickening agent, based on the total weight of component A.

Component A may further comprise an antibacterial or biocidal agent. The antibacterial or biocidal agents which can be used in the present invention may be selected from the group consisting of compounds of the isothiazolinone family, such as methylisothiazolinone (MIT), octylisothiazolinone (OIT) and benzoisothiazolinone (BIT) and their mixtures. Suitable antibacterial or biocidal agents are commercially available products. Exemplarily mentioned are Ecocide K35R (Progiven, France) and Nuosept OB 03 (Ashland, The Netherlands). Component A comprises at least about 0.001 wt.-%, preferably at least about 0.005 wt.-%, more preferably at least about 0.01 wt.-%, most preferably at least about 0.015 wt.-%, from about 0.001 wt.-% to about 1.5 wt.-%, preferably from about 0.005 wt.-% to about 0.1 wt.-%, more preferably from about 0.01 wt.-% to about 0.075 wt.-%, most preferably from about 0.015 wt.-% to about 0.03 wt.-% of said antibacterial or biocidal agent, based on the total weight of component A. In a preferred embodiment, component A comprises from about 0.015 wt.-% to about 0.03 wt.-% of Nuosept OB 03, based on the total weight of component A.

In an alternative embodiment, component A comprises at least one filler, in particular an organic or mineral filler. The filler which can be used in the present invention may be selected from the group consisting of quartz powder, preferably quartz powder having an averaged grain size (d50%) of about 16 μm, quartz sand, clay, fly ash, fumed silica, carbonate compounds, aluminas, pigments, titanium oxides, light fillers, and their mixtures. Suitable mineral fillers are commercially available products. Exemplarily mentioned is quartz powder Millisil W12 or W6 (Quarzwerke GmbH, Germany). Component A comprises at least about 1 wt.-%, preferably at least about 2 wt.-%, more preferably at least about 5 wt.-%, most preferably at least about 8 wt.-% of said at least one filler, based on the total weight of component A.

The water content comprised in component A as used in the present invention is at least about 1 wt.-%, preferably at least about 5 wt.-%, more preferably at least about 10 wt.-%, most preferably at least about 20 wt.-%, from about 1 wt.-% to about 50 wt.-%, preferably from about 5 wt.-% to about 40 wt.-%, more preferably from about 10 wt.-% to about 30 wt.-%, most preferably from about 15 wt.-% to about 25 wt.-%, based on the total weight of component A.

Further, component A may also comprise a chelating agent, which is known to a person skilled in the art. The presence of an accelerator, plasticizer, thickening agent as well as an antibacterial or biocidal agent and chelating agent does not change the overall inorganic nature of the cementitious component A.

Component A comprising the aluminous cement or calcium sulfoaluminate cement is present in aqueous-phase, preferably in form of a slurry or paste.

The calcium carbonate used in the inorganic mortar system for a chemical fastening of anchors and post-installed reinforcing bars in mineral substrates according to the present invention, is a calcium carbonate of high purity and having a high specific surface area (BET in $m^2/g$). In particular, the calcium carbonate has a crystalline calcite content determined by XRD of greater than 80% and has a specific surface area of greater than 15 $m^2/g$, preferably a crystalline calcite content determined by XRD of greater than 90% and a specific surface area of greater than 20 $m^2/g$.

In a particular preferred embodiment, the calcium carbonate used has a crystalline calcite content determined by XRD in the range of from 80% to 100% and has a specific surface area in the range of from 15 $m^2/g$ to 50 $m^2/g$, more preferably has a crystalline calcite content determined by XRD in the range of from 90% to 100% and has a specific surface area in the range of from 20 $m^2/g$ to 35 $m^2/g$.

Preferably, the calcium carbonate having a crystalline calcite content determined by XRD of greater than 80% and having a specific surface area of greater than 15 $m^2/g$ used according to the present invention, is comprised in the initiator component B of the inorganic mortar system. In a preferred embodiment of the present invention, the calcium carbonate is comprised in initiator component B further comprising an activator, at least one retarder, at least one mineral filler and water. The addition of calcium carbonate having a crystalline calcite content determined by XRD of greater than 80% and having a specific surface area of greater than 15 $m^2/g$ to the inorganic mortar system, such as an inorganic chemical anchors, is to lower the consumption of more expensive binder material and to improve some properties of the mixed material, especially to increase the load values.

Component B as used in the present invention comprises at least about 1 wt.-%, preferably at least about 5 wt.-%, more preferably at least about 8 wt.-%, most preferably at least about 10 wt.-%, from about 1 wt.-% to about 50 wt.-%, preferably from about 5 wt.-% to about 40 wt.-%, more preferably from about 8 wt.-% to about 30 wt.-%, most preferably from about 10 wt.-% to about 20 wt.-% of calcium carbonate having a crystalline calcite content determined by XRD of greater than 80% and having a specific surface area of greater than 15 $m^2/g$, preferably having a crystalline calcite content determined by XRD in the range of from 90% to 100% and having a specific surface area in the range of from 20 $m^2/g$ to 25 $m^2/g$, based on the total weight of component B.

Component B as used in the present invention further comprises an activator, at least one retarder, at least one mineral filler and water. To ensure a sufficient processing time, at least one retarder, which prevents premature hardening of the mortar composition, is used in a distinct concentration in addition to the activator component.

The activator present in component B comprises an alkali and/or alkaline earth metal salt or a mixture thereof.

In particular, the activator component is constituted of at least one alkali and/or alkaline earth metal salt selected from the group consisting of hydroxides, chlorides, sulfates, phosphates, monohydrogen phosphates, dihydrogen phosphates, nitrates, carbonates and mixtures thereof, preferably the activator component is an alkali or alkaline earth metal salt, more preferably is a calcium metal salt, such as calcium hydroxide, calcium sulfate, calcium carbonate, calcium formate, calcium nitrate or calcium phosphate, a sodium metal salt, such as sodium hydroxide, sodium sulfate, sodium carbonate, sodium nitrate or sodium phosphate, or a lithium metal salt, such as lithium hydroxide, lithium sulfate, lithium carbonate, lithium nitrate or lithium phosphate, or a potassium metal salt, such as potassium hydroxide, potassium sulfate, potassium carbonate, potassium formate, potassium nitrate or potassium phosphate, most preferably is sodium hydroxide.

Component B comprises at least about 0.01 wt.-%, preferably at least about 0.02 wt.-%, more preferably at least about 0.05 wt.-%, most preferably at least about 1 wt.-%, from about 0.01 wt.-% to about 40 wt.-%, preferably from about 0.02 wt.-% to about 35 wt.-%, more preferably from about 0.05 wt.-% to about 30 wt.-%, most preferably from about 1 wt.-% to about 25 wt.-% of said activator, based on the total weight of component B. In a particular preferred embodiment, the activator is sodium hydroxide. The water content comprised in component B is at least about 1 wt.-%, preferably at least about 5 wt.-%, more preferably at least about 10 wt.-%, most preferably at least about 20 wt.-%, from about 1 wt.-% to about 60 wt.-%, preferably from about 5 wt.-% to about 50 wt.-%, more preferably from about 10 wt.-% to about 40 wt.-%, most preferably from about 15 wt.-% to about 30 wt.-%, based on the total weight of component B. In a particular preferred embodiment the sodium hydroxide content comprised in component B is at least about 0.1 wt.-%, preferably at least about 1 wt.-%, more preferably at least about 2 wt.-%, most preferably at least about 3 wt.-%, from about 0.1 wt.-% to about 15 wt.-%, preferably from about 1 wt.-% to about 10 wt.-%, more preferably from about 2 wt.-% to about 8 wt.-%, most preferably from about 3 wt.-% to about 6 wt.-%, based on the total weight of component B.

The at least one retarder comprised in component B as used in the present invention is selected from the group consisting of citric acid, tartaric acid, lactic acid, salicylic acid, gluconic acid and mixtures thereof, preferably is a mixture of citric acid and tartaric acid. Component B comprises at least about 0.1 wt.-%, preferably at least about 0.2 wt.-%, more preferably at least about 0.5 wt.-%, most preferably at least about 1.0 wt.-%, from about 0.1 wt.-% to about 25 wt.-%, preferably from about 0.2 wt.-% to about 15 wt.-%, more preferably from about 0.5 wt.-% to about 15 wt.-%, most preferably from about 1.0 wt.-% to about 10 wt.-% of said retarder, based on the total weight of component B.

In a particular preferred embodiment of component B as used in the present invention, the ratio of citric acid/tartaric acid is 1.6/1.

The at least one mineral filler in addition to the calcium carbonate having a crystalline calcite content determined by XRD of greater than 80% and having a specific surface area of greater than 15 $m^2/g$ comprised in component B as used in the present invention is selected from the group consisting of limestone fillers, sand, corundum, dolomite, alkaline-resistant glass, alumina, crushed stones, gravels, pebbles and mixtures thereof, preferred are limestone fillers, such as various calcium carbonates. The at least one mineral filler is preferably selected from the group consisting of limestone fillers or quartz fillers, such as quartz powder Millisil W12 or W6 (Quarzwerke GmbH, Germany) and quartz sand. The at least one mineral filler of component B is most preferably a calcium carbonate or a mixture of calcium carbonates. Component B comprises at least about 20 wt.-%, preferably at least about 30 wt.-%, more preferably at least about 40 wt.-%, still more preferably at least about 50 wt.-%, most preferably at least about 60 wt.-%, from about 20 wt.-% to about 95 wt.-%, preferably from about 30 wt.-% to about 90 wt.-%, more preferably from about 40 wt.-% to about 85 wt.-%, still more preferably from about 50 wt.-% to about 80 wt.-%, most preferably from about 60 wt.-% to about 70 wt.-% of at least one mineral filler, based on the total weight of component B.

In a particular preferred embodiment, the at least one mineral filler comprised in component B is a mixture of three different calcium carbonates, i.e. calcium carbonate fines, such as different Omyacarb® types (Omya International AG, Germany). Most preferably, the first calcium carbonate has an average particle size (d50%) of about 3.2 μm and a residue of 0.05% on a 45 μm sieve (determined according to ISO 787/7). The second calcium carbonate has an average particle size (d50%) of about 7.3 μm and a residue of 0.5% on a 140 μm sieve (determined according to ISO 787/7). The third calcium carbonate has an average particle size (d50%) of about 83 μm and a residue of 1.0% on a 315 μm sieve (determined according to ISO 787/7).

In a particular preferred alternative embodiment, the at least one mineral filler comprised in component B is a mixture of three different quartz fillers. Most preferably, the first quartz filler is a quartz sand having an average particle size (d50%) of about 240 μm. The second quartz filler is a quartz powder having an average grain size (d50%) of about 40 μm. The third quartz filler is a quartz powder having an average grain size (d50%) of about 15 μm.

In an advantageous embodiment, component B further comprises the following characteristics, taken alone or in combination.

Component B may additionally comprise a thickening agent. The thickening agent to be used in the present invention may be selected from the group consisting of bentonite, silicon dioxide, quartz, thickening agents based on acrylate, such as alkali-soluble or alkali-swellable emulsions, fumed silica, clay and titanate chelating agents or combinations thereof. Exemplarily mentioned are polyvinyl alcohol (PVA), hydrophobically modified alkali soluble emulsions (HASE), hydrophobically modified ethylene oxide urethane polymers known in the art as HEUR, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose,2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, attapulgite clay, and mixtures thereof. Suitable thickening agents are commercially available products, such as Optigel WX (BYK-Chemie GmbH, Germany), Rheolate 1 (Elementis GmbH, Germany) and Acrysol ASE-60 (The Dow Chemical Company). Component B comprises at least about 0.01 wt.-%, preferably at least about 0.05 wt.-%, more preferably at least about 0.1 wt.-%, most preferably at least about 0.2 wt.-%, from about 0.01 wt.-% to about 15 wt.-%, preferably from about 0.05 wt.-% to about 10 wt.-%, more preferably from about 0.1 wt.-% to about 5 wt.-%, most preferably from about 0.2 wt.-% to about 1 wt.-% of said thickening agent, based on the total weight of component B.

Further, component B may also comprise a plasticizer, which is known to a person skilled in the art. The presence of a retarder and thickening agent as well as a plasticizer does not change the overall inorganic nature of the cementitious component B.

Component B comprising the activator and retarder is present in aqueous-phase, preferably in form of a slurry or paste.

It is preferred that the pH-value of component B is above 10, more preferably above 11 and most preferably is above 12, in particular in the range between 10 and 14, preferably between 11 and 13.

It is particular preferred that the proportions of water in the two components, namely component A and component B, are chosen so that the water to aluminous cement ratio (W/CAC) or water to calcium sulfoaluminate cement (W/CAS), in the product obtained by mixing components A and B is lower than 1.5, preferably between 0.2 and 0.8, most preferably between 0.3 and 0.5. In a preferred embodiment, the ratio of water to calcium aluminate cement comprising calcium sulfate ($W/(CAC+CaSO_4)$) in the product obtained by mixing components A and B is 0.35

It is particular preferred that the calcium carbonate having a crystalline calcite content determined by XRD of greater than 80% and having a specific surface area of greater than 15 $m^2/g$ in the product obtained by mixing components A and B is present in the range of from about 1.0 wt.-% to 30.0 wt.-%, preferably from about 1.5 wt.-% to 20.0 wt.-%, more preferably from about 2.0 wt.-% to 15.0 wt.-%, most preferably from about 5.0 wt.-% to 13.0 wt.-%.

Moreover, it is particular preferred that the proportion of retarder in component B is chosen so that the citric acid/tartaric acid to aluminous cement ratio and citric acid/tartaric acid to calcium sulfoaluminate cement, in the product obtained by mixing components A and B is lower than 0.1, preferably between 0.005 and 0.08, most preferably between 0.007 and 0.03.

In a most preferred embodiment, component A comprises or consists of the following components:

70 to 85 wt.-% of aluminous cement,
0.5 to 1.5 wt.-% of phosphoric acid,
0.05 to 2.0 wt. % lithium sulfate or lithium sulfate monohydrate,
0.5 to 1.5 wt.-% of plasticizer,
0.001 to 0.05 wt.-% of an antimicrobial or biocidal agent,
optionally 5 to 30 wt.-% of mineral fillers, and
15 to 25 wt.-% of water.

In a most preferred embodiment, component B comprises or consists of the following components:

2.0 wt.-% to 20 wt.-% of a calcium carbonate having a crystalline calcite content determined by XRD of greater than 80% and having a specific surface area of greater than 15 $m^2/g$,
0.1 wt.-% to 5 wt.-% of sodium hydroxide,
0.05 wt.-% to 5 wt.-% of citric acid,
0.05 wt.-% to 4 wt.-% of tartaric acid,
30 wt.-% to 45 wt.-% of a first mineral filler,
10 wt.-% to 30 wt.-% of a second mineral filler,
5.0 wt.-% to 20 wt.-% of a third mineral filler,
0.01 wt.-% to 0.5 wt.-% of a thickening agent, and
15 wt.-% to 25 wt.-% of water.

Component A as used in the present invention may be prepared as follows: The phosphor-containing blocking agent is mixed with water, so that the pH-value of the resulting mixture is about 2. Plasticizer and antibacterial/biocidal agent are added, and the mixture homogenized. Aluminous cement, optionally calcium sulfate, and optionally mineral filler are premixed and added stepwise to the mixture whilst increasing the stirring speed, so that the pH-value of the resulting mixture is below 7. Finally, accelerator and thickening agent are added and mixed until complete homogenization of the mixture.

Component B as used in the present invention may be prepared as follows: The activator is dissolved in deionized water, followed by subsequent addition of retarder and thickening agent under stirring. The calcium carbonate having a crystalline calcite content determined by XRD of greater than 80% and having a specific surface area of greater than 15 $m^2/g$ and other filler(s) is/are added stepwise whilst increasing the stirring speed until the mixture homogenizes, obtaining finally a smooth, liquid pasty slurry, the pH being above 12.

Component A and B are present in aqueous phase, preferably in form of a slurry or paste. In particular, components A and B have a pasty to fluid aspect according to their respective compositions. In one preferred embodiment, component A and component B are in paste form thereby preventing sagging at the time of mixing the two components.

The weight ratio between component A and component B (A/B) is preferentially comprised between 7/1 and 1/3, preferably is 3/1. Preferably, the composition of the mixture comprises 75 wt.-% of component A and 25 wt.-% of component B. In an alternative embodiment, the composition of the mixture comprises 25 wt.-% of component A and 75 wt.-% of component B.

The inorganic mortar system, preferably the two-component inorganic mortar system, is of mineral nature, which is not affected by the presences of additional thickening agents of other agents.

It is preferred that the inorganic mortar system has an initial set-time of at least 5 min, preferably of at least 10 min, more preferably of at least 15 min, most preferably of at least 20 min, in particular in the range of from about 5 to 25 min, preferably in the range of about 10 to 20 min, after mixing of the two components A and B.

In the multi-component inorganic mortar system, especially the two-component inorganic mortar system, the volume ratio of cementitious component A to initiator component B is 1:1 to 7:1, preferably is 3:1. In an alternative embodiment, the volume ratio of cementitious component A to initiator component B is 1:3 to 1:2.

After being produced separately, component A and component B are introduced into separate containers, from which they are ejected by means of mechanical devices and are guided through a mixing device. The inorganic mortar system is preferably a ready-for-use system, whereby component A and B are separately arranged from each other in a multi-chamber device, such as a multi-chamber cartridge and/or a multi-chamber cylinder or in two-component capsules, preferably in a two-chamber cartridge or in two-component capsules. The multi-chamber system preferably includes two or more foil bags for separating curable component A and initiator component B. The contents of the chambers or bags which are mixed together by a mixing device, preferably via a static mixer, can be injected into a borehole. The assembly in multiple chamber cartridges or pails or sets of buckets is also possible.

The hardening aluminous cement composition exiting from the static mixer is inserted directly into the borehole, which is required accordingly for fastening the anchors and post-installed reinforcing bars, and has been initially introduced into the mineral substrate, during the chemical fastening of anchors and post-installed reinforcing bars, whereupon the construction element to be fastened, for example an anchor rod, is inserted and adjusted, whereupon the mortar composition sets and hardens. In particular, the inorganic mortar system is to be considered as a chemical anchor for fastening metal anchors and post-installed reinforcing bars.

The role of calcium carbonate having a crystalline calcite content determined by XRD of greater than 80% and having a specific surface area of greater than 15 $m^2/g$ is considered to provide many nucleation sites for calcium aluminate hydrates due to its high specific surface area and additionally being a source of easily available soluble calcium- and carbonate ions leading to earlier supersaturation and hence precipitation of cement hydrates phases and formation of calcium aluminate monocarbonate hydrates preventing the cement conversion, which leads to a decrease of performance over time due to transformation of metastable hydrate phases $CAH_{10}$ and $C_2AH_8$ to the stable hydrate $C_3AH_6$.

The role of the mineral fillers in addition to the calcium carbonate having a crystalline calcite content determined by XRD of greater than 80% and having a specific surface area of greater than 15 $m^2/g$, in particular in component B, is to further adjust the final performance with regard to mechanical strength and performance as well as long term durability. By optimizing the fillers, it is possible to optimize the water/solids ratio which allows for an efficient and still faster hydration of the aluminous cement and a low porosity of the final cement matrix.

The inorganic mortar system comprising the calcium carbonate having a crystalline calcite content determined by XRD of greater than 80% and having a specific surface area of greater than 15 $m^2/g$ can be used for a chemical fastening of anchors and post-installed reinforcing bars, preferably of metal anchors and post-installed reinforcing bars, such as anchor rods, in particular threaded rods, bolts, steel reinforcement bars or the like into mineral substrates, such as structures made of brickwork, concrete, pervious concrete or natural stone. In particular, the inorganic mortar system can be used for a chemical fastening of anchors and post-installed reinforcing bars, such as metal anchors and post-installed reinforcing bars, in boreholes. It has been found out, that the use of calcium carbonate having a crystalline calcite content determined by XRD of greater than 80% and having a specific surface area of greater than 15 $m^2/g$ in such an inorganic mortar system significantly accelerates calcium aluminate cement hydration as well as increases the load values and hence load capacity in boreholes, especially at earlier curing times.

Hence, the use of calcium carbonate having a crystalline calcite content determined by XRD of greater than 80% and having a specific surface area of greater than 15 $m^2/g$ according to the present invention, in addition to mineral fillers present in the inorganic mortar system, is particular to accelerate calcium aluminate cement hydration. Moreover, the addition of calcium carbonate having a crystalline calcite content determined by XRD of greater than 80% and having a specific surface area of greater than 15 $m^2/g$ to materials, such as an inorganic chemical anchors, is advantageous to lower the consumption of more expensive binder material or to improve some properties of the mixed material.

The calcium carbonate having a crystalline calcite content determined by XRD of greater than 80% and having a specific surface area of greater than 15 $m^2/g$ comprised in the inorganic mortar is particularly applied in a method for a chemical fastening of anchors and post-installed reinforcing bars, preferably of metal anchors and post-installed reinforcing bars, in mineral substrates, such as structures made of brickwork, concrete, pervious concrete or natural stone.

Moreover, the inorganic mortar system comprising the calcium carbonate having a crystalline calcite content determined by XRD of greater than 80% and having a specific surface area of greater than 15 $m^2/g$ may be used for the attachment of fibers, scrims, fabrics or composites, in particular of high-modulus fibers, preferably of carbon fibers, in particular for the reinforcement of building structures, for example walls or ceilings or floors, or further for mounting components, such as plates or blocks, e.g. made of stone, glass or plastic, on buildings or structural elements. However, in particular it is used for fastening of anchors and post-installed reinforcing bars, preferably metal anchors and post-installed reinforcing bars, such as anchor rods, in particular threaded rods, bolts, steel reinforcement bars or the like into recesses, such as boreholes, in mineral substrates, such as structures made of brickwork, concrete, pervious concrete or natural stone, whereby the components of the two-component inorganic mortar system are prior mixed, for example by means of a static mixer or by destroying a cartridge or a plastic bag, or by mixing components of a multi-chamber pails or sets of buckets.

The following example illustrates the invention without thereby limiting it.

EXAMPLES

1. Calcium Carbonates Used in the Inorganic Mortar System

The used calcium carbonates (also referred to as calcites) are all commercially available products: Omyabrite 1300 X-OM, Omya GmbH, Germany; Betocarb UF, Omya GmbH, Germany; Germany; Socal 31, Imerys Carbonates, France; Socal UP-G, Imerys Carbonates, France; ImExtend 90, Imerys Carbonates, France; Calofort U, Keyser & Mackay, Germany.

The selected calcium carbonates were characterized with respect to their particle size (d10, d50 and d90), their specific surface area (BET) and their purity (crystalline calcite content as determined by XRD with a calcite standard). Table 1 shows the particle size distribution of the commercial calcites used.

TABLE 1

Summary of the particle sizes of the reactive calcium carbonates.

| | Particle size (d10) [μm] | Particle size (d50) [μm] | Particle size (d90) [μm] |
|---|---|---|---|
| Omyabrite 1300 X-OM | 0.55 | 5.54 | 12.85 |
| Betocarb UF | 0.61 | 1.39 | 2.98 |
| Socal 31 | 1.13 | 19.45 | 98.22 |
| Socal UP-G | 1.05 | 2.14 | 5.07 |
| ImExtend 90 | 0.66 | 1.65 | 3.87 |
| Calofort U | 1.25 | 5.82 | 20.78 |

| | Specific surface area (BET) [$m^2/g$] | Crystalline Calcite content [%] | Total crystalline content [%] |
|---|---|---|---|
| Omyabrite 1300 X-OM | 21.8 | 67.9 | 82.5 |
| Betocarb UF | 9.3 | 95.8 | 97.9 |
| Socal 31 | 19.4 | 89.9 | 90.1 |
| Socal UP-G | 24.5 | 90.4 | 90.7 |

-continued

| | Specific surface area (BET) [$m^2/g$] | Crystalline Calcite content [%] | Total crystalline content [%] |
|---|---|---|---|
| ImExtend 90 | 11.7 | 92.4 | 93.3 |
| Calofort U | 18.5 | 93.7 | 94.0 |

2. Characterization of the Impact of the Reactive Calcium Carbonates on the Hydration of Calcium Aluminate Cement Isothermal heat flow calorimetry is a common tool to assess the reactivity of cementitious mortars. The screening of different calcites (calcium carbonates) and their effectiveness to accelerate the hydration reaction of calcium aluminate cement was evaluated by using a TAM Air calorimeter by TA Instruments. The respective dry mixes and aqueous solutions holding admixtures were equilibrated separately for 24 h at 23° C. The dry mixes consisted of Ternal White®, quartz and the respective calcite filler. The aqueous solution for all experiments comprised water, lithium sulfate, Ethacryl G, citric acid and tartaric acid. The mixing liquid was injected into the dry mix and stirred manually for 60 s to ensure homogeneity. Recording was started after the insertion of the mixed samples. All performed repeated experiments showed the same course of hydration and therefore the mean value of three curves was chosen to describe the typical reaction.

The composition of the mixes for the calorimetric measurements was in every case: 60.23 wt.-% Ternal White®, 16.12 wt.-% quartz sand, 3.97 wt.-% calcite filler, 18.33 wt.-% water, 0.45 wt.-% Ethacryl G, 0.11 wt.-% $Li_2SO_4$, 0.49 wt.-% citric acid and 0.30 wt.-% tartaric acid. For each measurement, the calcite filler in the mix was varied between Omyabrite 1300 X-OM, Betocarb UF, Calofort U, ImExtend90, Socal 31 and Socal UP-G.

Figure 2:
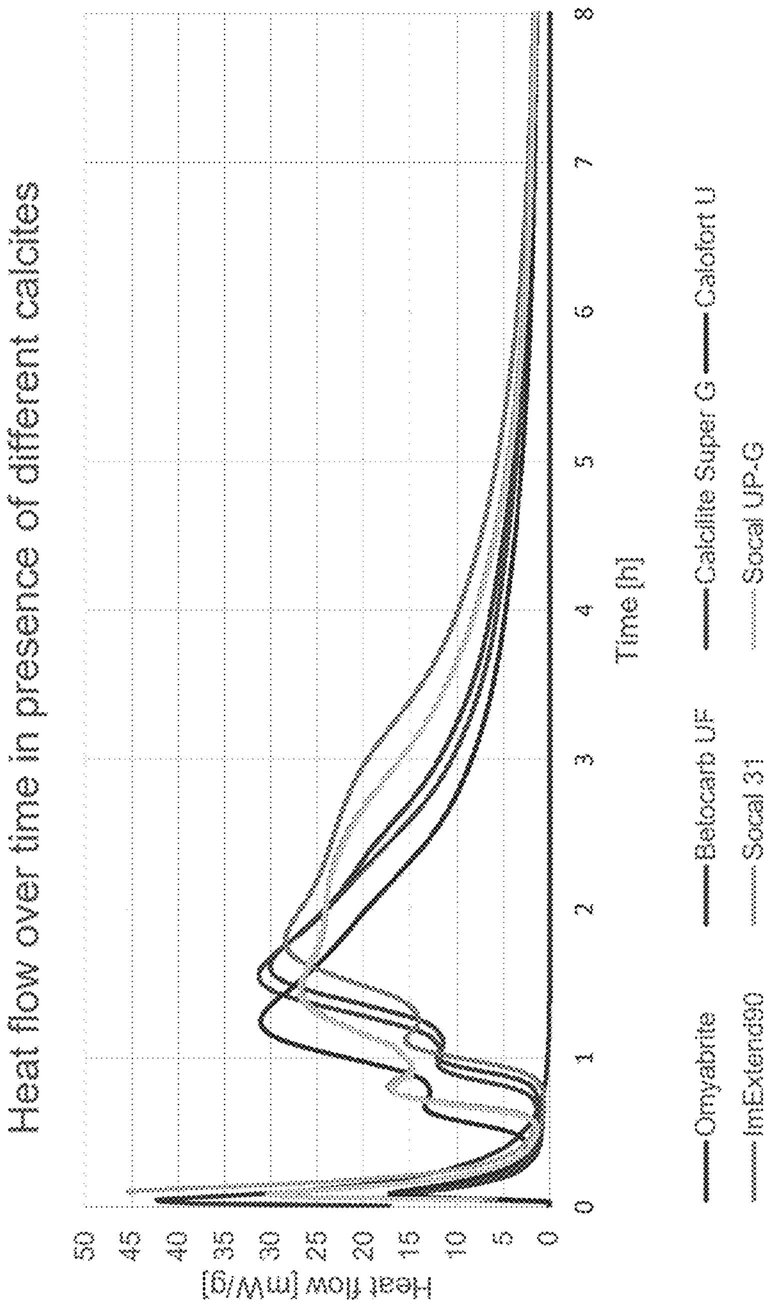
FIG. 2 shows a second graph of heat flow measurements of the hydration of calcium aluminate cement admixed with different types of calcites.

Heat flow measurements (FIG. 1 and FIG. 2) of the hydration of calcium aluminate cement admixed with different types of calcites reveal that the mixture containing Omyabrite 1300 X-OM, which is the most impure calcite, exhibits the longest induction period and cement hydration begins ~29 hours after mixing. All other systems show the main peak of the heat of hydration within the first 8 hours after mixing. The shortest induction periods and hence the earliest heat of hydration was detected for the calcites Calofort U, Socal UP-G and Socal 31, which exhibit all a very high BET surface area and are of high crystallinity and purity. Calcites comprising very fine particles, a high crystallinity and a specific surface area BET<15 $m^2/g$ like Betocarb UF and ImExtend90 show already a delayed induction period compared to calcium carbonate having a crystalline calcite content determined by XRD of greater than 80% and having a specific surface area of greater than 15 $m^2/g$.

3. Preparation of Component A and B of the Inorganic Mortar System

The cementitious component A as well as the initiator component B of the comparative examples 1 to 3 and of inventive examples 4 to 6 are initially produced by mixing the constituents specified in Tables 3 to 5, respectively. The proportions that are given are expressed in wt.-%.

3.1. Component A 16.38 grams deionized water, 0.75 grams of 85% phosphoric acid (blocking agent), 1.2 grams Ethacryl G® (superplasticizer), and 0.02 grams Nuosept® (biocide) were homogenized at room temperature, and whilst stirring with a dissolver, the calcium aluminate cement (81.00 grams, pure Ternal White®) is added in subsequent small portions, to obtain finally a smooth, liquid pasty slurry of the blocked cement in water, the pH being below 7. After addition of the calcium aluminate cement, 0.15 grams of lithium sulfate monohydrate and 0.5 grams xanthan gum (thickener) were added and the slurry was homogenized.

TABLE 3

Composition of binder component A:

| Ingredients of component A | Binder component A0 |
|---|---|
| Water | 16.38 |
| Ternal White | 81.00 |
| $Li_2SO_4$ | 0.15 |
| 85% $H_3PO_4$ | 0.75 |
| Xanthan Gum | 0.50 |
| Ethacryl G | 1.20 |
| Nuosept | 0.02 |

Phosphoric acid 85% marketed by Sigma-Aldrich Chemie GmbH, Germany; $Li_2SO_4$ monohydrate marketed by Alfa Aesar GmbH & Co. KG, Germany; Ethacryl G marketed by Coatex S.A., France; Ternal White ® marketed by Kerneos S.A., France; Xanthan Gum marketed by Kremer Pigmente GmbH & CO. KG, Germany; Nuosept OB 03 marketed by Ashland Nederland B.V., The Netherlands.

3.2 Component B

In 20.43 grams of deionized water, 4.0 grams of NaOH pellets (Activator), 0.65 grams of Ecodis® P50 (superplasticizer), 0.4 grams Optigel® WX (thickener), 1.93 grams of citric acid and 1.20 grams of tartaric acid were dissolved. Whilst stirring with a dissolver, 71.39 grams of a mixture of the following fillers was added in subsequent portions: 34.0 grams Omyacarb 130 AL, 15.39 grams Omyacarb 15H AL, 9.0 grams Omyacarb 2 AL (=58.39 wt.-% of a standard filler mix of coarse calcium carbonates) and 13.0 grams of the respective reactive Calcite, to obtain finally a smooth, liquid pasty slurry of the fillers in water, the pH being above 12.

TABLE 4

Composition of initiator components B:

| Ingredients of component B | Initiator components B1-6 |
|---|---|
| Water | 20.43 |
| NaOH (s) | 4.00 |
| Citric acid | 1.93 |
| Tartaric acid | 1.20 |
| Ecodis P50 | 0.65 |
| Omyacarb 130 AL | 34.00 |
| Omyacarb 15H AL | 15.39 |
| Omyacarb 2 AL | 9.00 |
| Reactive calcite* | 13.00 |
| Optigel WX | 0.40 |

NaOH marketed, Germany; Citric acid marketed by Sigma-Aldrich Chemie GmbH, Germany; Tartaric acid marketed by BCD Chemie GmbH, Germany; Omyacarb 130-AI, Omyacarb 15-H AI, Omyacarb 2-AI marketed by Omya International AG, Germany; Optigel WX marketed by BYK Chemie GmbH, Germany.
*See Table 5 for type of reactive calcite in B1-B6.

TABLE 5

Reactive calcites in component B1 to B6:

| | Reactive calcite in B-components | | | | | |
|---|---|---|---|---|---|---|
| | B1 | B2 | B3 | B4 | B5 | B6 |
| Omyabrite 1300 X-OM | X | — | — | — | — | — |
| Betocarb UF | — | X | — | — | — | — |
| ImExtend 90 | — | — | X | — | — | — |
| SOCAL 31 | — | — | — | X | — | — |

TABLE 5-continued

| Reactive calcites in component B1 to B6: | | | | | | |
|---|---|---|---|---|---|---|
| | Reactive calcite in B-components | | | | | |
| | B1 | B2 | B3 | B4 | B5 | B6 |
| SOCAL UP-G | — | — | — | — | X | — |
| Calofort U | — | — | — | — | — | X |

4. Determination of the Mechanical Performance

After the preparation, the binder component AO and the respective components B1-B6 were filled into separate chambers of a two-component plastic hard cartridge with a defined ratio of component A:B=3:1. The hard cartridge was placed into a dispenser, a static mixer was attached, and the mortar was injected into boreholes in a concrete slab and a threaded rod (M12) inserted. The boreholes exhibited a depth of 72 mm and a diameter of 14 mm. The boreholes were cleaned by compressed air cleaning and brushing prior to injection of the mortar. The pull-out strength was measured after certain curing times to measure the improvement of the curing time of the mortars.

TABLE 6

Bond strengths of the examples comprising the different reactive calcites after certain curing times.

| Mortar mixes | Bond strengths after certain curing times [N/mm$^2$] 15 h | 18 h | 24 h |
|---|---|---|---|
| A0 + B1 (comparative 1) | 22.5 | 22.6 | 22.5 |
| A0 + B2 (comparative 2) | 20.3 | 22.5 | 23.9 |
| A0 + B3 (comparative 3) | 23.5 | 23.6 | 23.3 |
| A0 + B4 (inventive 4) | 24.6 | 24.8 | 25.0 |
| A0 + B5 (inventive 5) | 24.7 | 24.9 | 25.0 |
| A0 + B6 (inventive 6) | 26.1 | 27.9 | 28.1 |

It can be seen that the mortars comprising calcites of high purity and having a high BET surface (>15 m$^2$/g), namely Calofort U, Socal 31 and Socal UP-G, exhibit higher bond strengths compared to those comprising calcites with lower specific surface area, namely Omyabrite 1300 X-OM, Betocarb UF and ImExtend90. This effect is especially pronounced at shorter curing times (<18 h), which provides a big benefit in terms of saving labor hours, as the fastened elements can be loaded earlier and the workflow on jobsites is not compromised.

Such calcites provide a much higher acceleration than calcites having a small particle size and a low specific surface area and surface-treated calcites exhibiting a high specific surface area but having a lower calcite content.

Almost all inventive systems show considerable bond strengths after 15 hours of curing as well as increased load values and hence, improved mechanical strength when it comes to a chemical fastening of anchors and post-installed reinforcing bars, in comparison to the comparative systems not comprising any calcium carbonate having a crystalline calcite content determined by XRD of greater than 80% and having a specific surface area of greater than 15 m$^2$/g. The addition of calcium carbonate having a crystalline calcite content determined by XRD of greater than 80% and having a specific surface area of greater than 15 m$^2$/g results in a significant increase of load values when compared to systems not comprising any calcium carbonate having a crystalline calcite content determined by XRD of greater than 80% and having a specific surface area of greater than 15 m$^2$/g even after short curing times. Moreover, it has been shown that the performance improves significantly in boreholes when high load values are desired.

Furthermore, it was found that the inventive systems comprising calcium carbonate having a crystalline calcite content determined by XRD of greater than 80% and having a specific surface area of greater than 15 m$^2$/g do not show any micro-cracks after curing. Hence, the inventive systems provide for a dense, sealed anchoring system which is an important pre-condition for obtaining improved corrosion and freeze-thaw resistance as well as provide for high load values.

Finally, it has been shown that the use of a calcium carbonate having a crystalline calcite content determined by XRD of greater than 80% and having a specific surface area of greater than 15 m$^2$/g in an inorganic calcium aluminate cement-based system prevents a transformation of metastable hydrate phases $CAH_{10}$ and $C_2AH_8$ to the stable hydrate $C_3AH_6$, thereby preventing a decrease of performance over time and at the same time promote the acceleration of the hydration. As it has been shown above, the addition of calcium carbonate having a crystalline calcite content determined by XRD of greater than 80% and having a specific surface area of greater than 15 m$^2$/g to materials, such as an inorganic chemical anchors, results in an increase of load values and at the same time lowers the consumption of more expensive binder material and improves some properties of the mixed material.

The invention claimed is:

1. An inorganic mortar system, comprising:
a curable aluminous cement component A; and
an initiator component B for initiating the curing process to accelerate calcium aluminate cement hydration;
the inorganic mortar system comprising a calcium carbonate having a crystalline calcite content determined by XRD of greater than 80% and having a specific surface area of greater than 15 m$^2$/g in component A and/or component B; and
wherein the component A and the component B are separate.

2. The inorganic mortar system according to claim 1, wherein component A further comprises at least one blocking agent, at least one accelerator and water, and component B comprises an activator, at least one retarder, at least one mineral filler and water.

3. The inorganic mortar system according to claim 1, wherein the aluminous cement component A is an aluminous cement component based on an aqueous-phase calcium aluminate cement.

4. The inorganic mortar system according to claim 2, wherein the aluminous cement component A further comprises at least one blocking agent, and the at least one blocking agent is at least one selected from the group consisting of boric acid, phosphoric acid, metaphosphoric acid, phosphorous acid and phosphonic acids.

5. The inorganic mortar system according to claim 1, wherein the calcium carbonate has a crystalline calcite content determined by XRD in the range of from 80% to 100% and has a specific surface area in the range of from 15 m$^2$/g to 50 m$^2$/g.

6. The inorganic mortar system according to claim 1, wherein the calcium carbonate is comprised in the initiator component B of the inorganic mortar system.

7. The inorganic mortar system according to claim 6, wherein the calcium carbonate comprised in the initiator component B is present in the range of from about 1.0 wt.-% to 50.0 wt.-%, based on the total weight of component B.

8. The inorganic mortar system according to claim 2, wherein the initiator component B further comprises an activator, at least one retarder, at least one mineral filler and water, and the activator comprises an alkali and/or alkaline earth metal salt, the at least one retarder is selected from the group consisting of citric acid, tartaric acid, lactic acid, salicylic acid, gluconic acid and mixtures thereof, and the at least one mineral filler is selected from the group consisting of limestone fillers, sand, corundum, dolomite, alkaline-resistant glass, alumina, crushed stones, gravels, pebbles and mixtures thereof.

9. The inorganic mortar system according to claim 2, wherein the initiator component B further comprises an activator, at least one retarder, at least one mineral filler and water, and the activator component comprises at least one alkali and/or alkaline earth metal salt selected from the group consisting of hydroxides, chlorides, sulfates, phosphates, monohydrogen phosphates, dihydrogen phosphates, nitrates, carbonates and mixtures thereof.

10. The inorganic mortar system according to claim 1, further comprising:

at least one anchor and/or post-installed reinforcing bar selected from the group consisting of anchor rods, threaded anchor rods, bolts and steel reinforcement bars.

11. The inorganic mortar system according to claim 1, wherein the inorganic mortar system is for anchoring in: at least one mineral substrate selected from the group consisting of structures made of brickwork, concrete, pervious concrete and natural stone.

12. The inorganic mortar system according to claim 1, wherein the inorganic mortar system is a multi-component inorganic mortar system.

13. A method of chemical fastening anchors and post-installed reinforcing bars in mineral substrates, comprising: curing the inorganic mortar system of claim 1 with an anchor and/or post-installed reinforcing bar within a borehole of a mineral substrate.

14. A method for chemical fastening of anchors and post-installed reinforcing bars in mineral substrates, the method comprising:

utilizing an inorganic mortar system for fastening, the inorganic mortar system comprising:

a curable aluminous cement component A; and an initiator component B for initiating the curing process, wherein the component A further comprises at least one blocking agent, at least one accelerator and water, and the component B comprises an activator, at least one retarder, at least one mineral filler and water, and the inorganic mortar system contains calcium carbonate having a crystalline calcite content determined by XRD of greater than 80% and having a specific surface area of greater than 15 $m^2/g$:

wherein the component A and the component B are separate and the calcium carbonate is incorporated into component A and/or component B.

* * * * *